(12) United States Patent
Hanyu et al.

(10) Patent No.: US 6,641,913 B1
(45) Date of Patent: Nov. 4, 2003

(54) HEAT-SEALABLE FILMS

(75) Inventors: Aiko Hanyu, Houston, TX (US); Ben Wayne Hicks, Shoreacres, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/454,799

(22) Filed: Dec. 3, 1999

(51) Int. Cl.[7] .................................................. B32B 7/12
(52) U.S. Cl. ................. 428/349; 428/516; 428/355 EN
(58) Field of Search ................ 428/349, 516, 428/355 EN

(56) References Cited

U.S. PATENT DOCUMENTS

| | | | |
|---|---|---|---|
| 4,029,876 A | 6/1977 | Beatty et al. | |
| 4,692,380 A | 9/1987 | Reid | |
| 4,892,851 A | 1/1990 | Ewen et al. | |
| 5,206,075 A | 4/1993 | Hodgson | 428/216 |
| 5,225,500 A | 7/1993 | Elder | |
| 5,243,002 A | 9/1993 | Razavi | |
| 5,252,384 A | * 10/1993 | Bothe et al. | 428/212 |
| 5,254,394 A | * 10/1993 | Bothe et al. | 428/212 |
| 5,573,723 A | 11/1996 | Peiffer et al. | |
| 5,807,800 A | 9/1998 | Shamshoum et al. | |
| 6,017,615 A | 1/2000 | Thakker et al. | 428/213 |

FOREIGN PATENT DOCUMENTS

| | | |
|---|---|---|
| CN | 2178104 | 12/1996 |
| EP | 0351392 | 1/1990 |
| EP | 0668157 | 8/1995 |
| EP | 0745638 | 12/1996 |
| JP | 7223690 | 8/1995 |
| WO | 0050237 | 8/2000 |

* cited by examiner

*Primary Examiner*—James J. Seidleck
*Assistant Examiner*—Melanie Bissett
(74) *Attorney, Agent, or Firm*—William D. Jackson; Bradley A. Misley

(57) ABSTRACT

A multilayer polyolefin film of the type suitable for packaging application in which heat seals are formed, and in its preparation the multilayer film comprises a flexible substrate layer formed of a crystalline thermoplastic polymer having an interface surface. A heat-sealable surface layer is bonded to the interface surface of the substrate layer and is formed of a syndiotactic propylene polymer effective to produce a heat seal with itself at a sealing temperature of less than 110° C. The surface layer has a thickness which is less than the thickness of the substrate layer. The heat-seal layer can be formed of syndiotactic polypropylene polymerized in the presence of a syndiospecific metallocene catalyst and having a melt flow index of less than 2 grams/10 minutes. The multilayer film can take the form of a a biaxially-oriented film. In the production of the multilayer film incorporating a substrate layer and a heat-sealable surface layer, a crystalline thermoplastic polymer is extruded and formed into a substrate layer film. A second polymer comprising a syndiotactic propylene polymer which is effective to form a heat-sealable surface layer is extruded to form a surface layer that is bonded to the interface of the substrate layer at a temperature within the range of 150–260° C.

19 Claims, 4 Drawing Sheets

HEAT-SEALABLE FILMS

FIELD OF THE INVENTION

This invention relates to multilayer polyolefin films of the type suitable for packaging applications involving heat-sealing.

BACKGROUND OF THE INVENTION

Multilayer polyolefin films incorporate a base or a substrate layer of a stereoregular crystalline thermoplastic polymer and one or more surface plies which can be formed on one or both sides of the base layer. Isotactic polypropylene is one of a number of crystalline polymers that can be characterized in terms of the stereoregularity of the polymer chain. Various stereospecific structural relationships denominated primarily in terms of syndiotacticity and isotacticity may be involved in the formation of stereoregular polymers from various monomers. Stereospecific propagation may be applied in the polymerization of ethylenically unsaturated monomers such as $C_3$+alpha olefins, 1-dienes such as 1,3-butadiene, substituted vinyl compounds such as vinyl aromatics, e.g. styrene or vinyl chloride, vinyl chloride, vinyl ethers such as alkyl vinyl ethers, e.g. isobutyl vinyl ether, or even aryl vinyl ethers. Stereospecific polymer propagation is probably of most significance in the production of polypropylene of isotactic or syndiotactic structure.

Isotactic polypropylene is conventionally used in the production of relatively thin films in which the polypropylene is heated and then extruded through dies and subject to biaxial orientation by stressing the film in both a longitudinal direction (referred to as the machine direction) and in a transverse or lateral direction sometimes referred to as the "tenter" direction. The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following chemical formula:

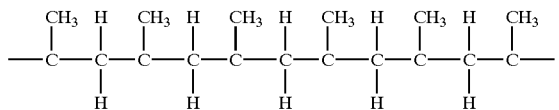

(1)

Stereoregular polymers, such as isotactic and syndiotactic polypropylene, can be characterized in terms of the Fisher projection formula. Using the Fisher projection formula, the stereochemical sequence of isotactic polypropylene as shown by Formula (2) is described as follows:

(2)

Another way of describing the structure is through the use of NMR. Bovey's NMR nomenclature for an isotactic pentad is ... mmmm ... with each "m" representing a "meso" dyad, or successive methyl groups on the same side of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the polymer chain lie on alternate sides of the plane of the polymer. Using the Fisher projection formula, the structure of syndiotactic polypropylene can be shown as follows:

(3)

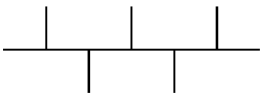

Syndiotacticity can be characterized in terms of the syndiotactic pentad rrrr in which each "r" represents a racemic dyad. Syndiotactic polymers are semi-crystalline and, like the isotactic polymers, are essentially insoluble in xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product.

For many applications the preferred polymer configuration will be a predominantly isotactic or syndiotactic polymer with very little atactic polymer. Catalysts that produce isotactic polyolefins are disclosed in U.S. Pat. Nos. 4,794,096 and 4,975,403 to Ewen. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes that may be characterized by the following formula:

(4)

In Formula (4), ($C_5$ ($R'$)$_4$) is a cyclopentadienyl or substituted cyclopentadienyl group, $R'$ is independently hydrogen or a hydrocarbyl radical having 1–20 carbon atoms, and $R''$ is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

Metallocene catalysts, such as those described above, can be used either as so-called "neutral metallocenes" in which case an alumoxane, such as methylalumoxane, is used as a co-catalyst, or they can be employed as so-called "cationic metallocenes" which incorporate a stable non-coordinating anion and normally do not require the use of an alumoxane. For example, syndiospecific cationic metallocenes are disclosed in U.S. Pat. No. 5,243,002 to Razavi. As disclosed there, the metallocene cation is characterized by the cationic metallocene ligand having sterically dissimilar ring structures that are joined to a positively-charged coordinating transition metal atom. The metallocene cation is associated with a stable non-coordinating counter-anion. Similar relationships can be established for isospecific metallocenes.

Catalysts employed in the polymerization of alpha-olefins may be characterized as supported catalysts or unsupported catalysts, sometimes referred to as homogeneous catalysts. Metallocene catalysts are often employed as unsupported or homogeneous catalysts, although, as described below, they also may be employed in supported catalyst components. Traditional supported catalysts are the so-called "conventional" Ziegler-Natta catalysts, such as titanium tetrachloride supported on an active magnesium dichloride as disclosed, for example, in U.S. Pat. Nos. 4,298,718 and 4,544,717, both to Mayr et al. A supported catalyst component, as disclosed in the Mayr '718 patent, includes titanium tetrachloride supported on an "active" anhydrous magnesium dihalide, such as magnesium dichloride or magnesium dibromide. The supported catalyst component in Mayr '718 is employed in conjunction with a co-catalyst such and an alkylaluminum compound, for example, triethylaluminum (TEAL). The Mayr '717 patent discloses a similar compound that may also incorporate an electron donor compound which may take the form of various amines, phosphenes, esters, aldehydes, and alcohols.

While metallocene catalysts are generally proposed for use as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described in the Welborn '432 patent, the support may be any support such as talc, an inorganic oxide, or a resinous support material such as a polyolefin. Specific inorganic oxides include silica and alumina, used alone or in combination with other inorganic oxides such as magnesia, zirconia and the like. Non-metallocene transition metal compounds, such as titanium tetrachloride, are also incorporated into the supported catalyst component. The Welborn '561 patent discloses a heterogeneous catalyst that is formed by the reaction of a metallocene and an alumoxane in combination with the support material. A catalyst system embodying both a homogeneous metallocene component and a heterogeneous component, which may be a "conventional" supported Ziegler-Natta catalyst, e.g. a supported titanium tetrachloride, is disclosed in U.S. Pat. No. 5,242,876 to Sharishoum et al. Various other catalyst systems involving supported metallocene catalysts are disclosed in U.S. Pat. Nos. 5,308,811 to Suga et al and U.S. Pat. No. 5,444,134 to Matsumoto.

The polymers normally employed in the preparation of biaxially-oriented polypropylene films are usually those prepared through the use of conventional Ziegler-Natta catalysts of the type disclosed, for example, in the aforementioned patents to Mayr et al. Thus, U.S. Pat. No. 5,573,723 to Peiffer et al discloses a process for producing biaxially-oriented polypropylene film having a base layer formed of an isotactic polypropylene homopolymer or propylene ethylene co-polymers. Other co-polymers of propylene and alpha-olefins having from 4–8 carbon atoms also may be employed in the Peiffer process. Thus, the base layer may take the form of a mixture of isotactic polypropylene or ethylene propylene copolymers with resin polymers such as styrene homopolymers having a softening point of about 130–180° C. The surface layer or layers may likewise take the form of a propylene homopolymer or copolymer of the same type employed in the base layer.

Processes for the preparation of biaxially-oriented polypropylene films employing polymers produced by the use of isospecific metallocenes involving di- or tri- substituted indenyl groups are disclosed in Canadian Patent Application No. 2,178,104. Four isotactic polymers disclosed there are based upon the polymerization of propylene in the presence of heavily substituted bis(indenyl) ligand structures. In each case, the metallocene used was a silicon-bridged di-or tri- substituted bis(indenyl) zirconium dichloride. More specifically, the metallocene catalysts used are identified in the aforementioned Canadian patent as rac-dimethylsilanediethyl bis(2-methyl-4,6 diisopropyl-1 indenyl) zirconium dichloride, 2 rac-dimethylsilanediethyl bis(2-methyl4,5-benzo-1-indenyl) zirconium dichloride, 3 rac-dimethylsilanediethyl bis(2-methyl-4-phenyl-1-indenyl) zirconium dichloride, and 4 rac-dimethylsilanediethyl bis(2-ethyl4phenyl-1-indenyl) zirconium dichloride. The various polymers produced by these metallocenes catalysts are characterized in terms of molecular weight, molecular weight distribution, melting point, meltflow index, mean isotactic block length, and isotactic index as defined in terms of mm triads. The polymers produced had isotactic indices, as thus defined, of about 97–98% as contrasted with an isotactic index of 93% for a commercial polypropylene compared with a conventional Ziegler-Natta catalyst and molecular weight distributions ranging from about 2.0 to 3.0 as contrasted with a molecular weight distribution of 4.5 for the polypropylene produced by the conventional Ziegler-Natta catalyst. Similarly, as in the case of the aforementioned patent to Peiffer et al, the Canadian '104 application discloses multilayer films in which the base ply and one or two top plies can be formed of the same or different propylene polymers including propylene homopolymers or copolymers or terpolymers. Where a propylene homopolymer is employed in the top ply, it is described as having a melting point of at least 140° C. Similarly, as in the case of the aforementioned patent to Peiffer et al, the Canadian '104 application discloses multilayer films in which the base ply and one or two top plies can be formed of the same or different propylene polymers including propylene homopolymers or copolymers or terpolymers. Where a propylene homopolymer is employed in the top ply, it is described as having a melting point of at least 140° C. and a melt flow index of 1 to 20 grams/10 minutes. In the Canadian '104 application a typical film structure, the base ply is characterized as providing at least 40% and typically 50–98% of the total film thickness with the outer ply or plies supplying the remainder of the film thickness. Specific overall film thicknesses disclosed in the Canadian '104 application range from 4 to 100 microns and more specifically 6 to 30 microns with the base ply specifically ranging from 1.5 to 10 microns and the outer plies from 0.4 to 1.5 microns.

SUMMARY OF THE INVENTION

In accordance with the present invention, there is provided a multilayer polyolefin film of the type suitable for packaging application in which heat seals are formed. The multilayer film comprises a flexible substrate layer formed of a crystalline thermoplastic polymer having an interface surface. A heat-sealable surface layer is bonded to the interface surface of the substrate layer. The surface layer is formed of a syndiotactic propylene polymer which is effective to produce a heat seal with itself at a sealing temperature of less than 110° C. The surface layer has a thickness which is less than the thickness of the substrate layer. Preferably, the substrate layer has an average thickness within the range of 5–150 microns, and the surface layer has a thickness which is no more than one-half the thickness of the substrate layer, preferably no more than ⅓ of the thickness of the substrate layer and having a thickness within the range of 0.3–50 microns. Preferably, the heat-seal layer is formed of syndiotactic polypropylene polymerized in the presence of a syndiospecific metallocene catalyst and having a melt flow index of less than 2 grams/10 minutes. Preferably, the multilayer film is a biaxially-oriented film.

In a further aspect of the invention, there is provided a process for the production of a multilayer film incorporating a substrate layer and a heat-sealable surface layer. In carrying out the invention, a crystalline thermoplastic polymer is extruded and formed into a substrate layer film. A second polymer is employed comprising a syndiotactic propylene polymer which is effective to form a heat-sealable surface layer. The propylene polymer is extruded to form a surface layer that is bonded to the interface of the substrate layer at a temperature within the range of 150–260° C.

DETAILED DESCRIPTION OF THE INVENTION

Figure 1:
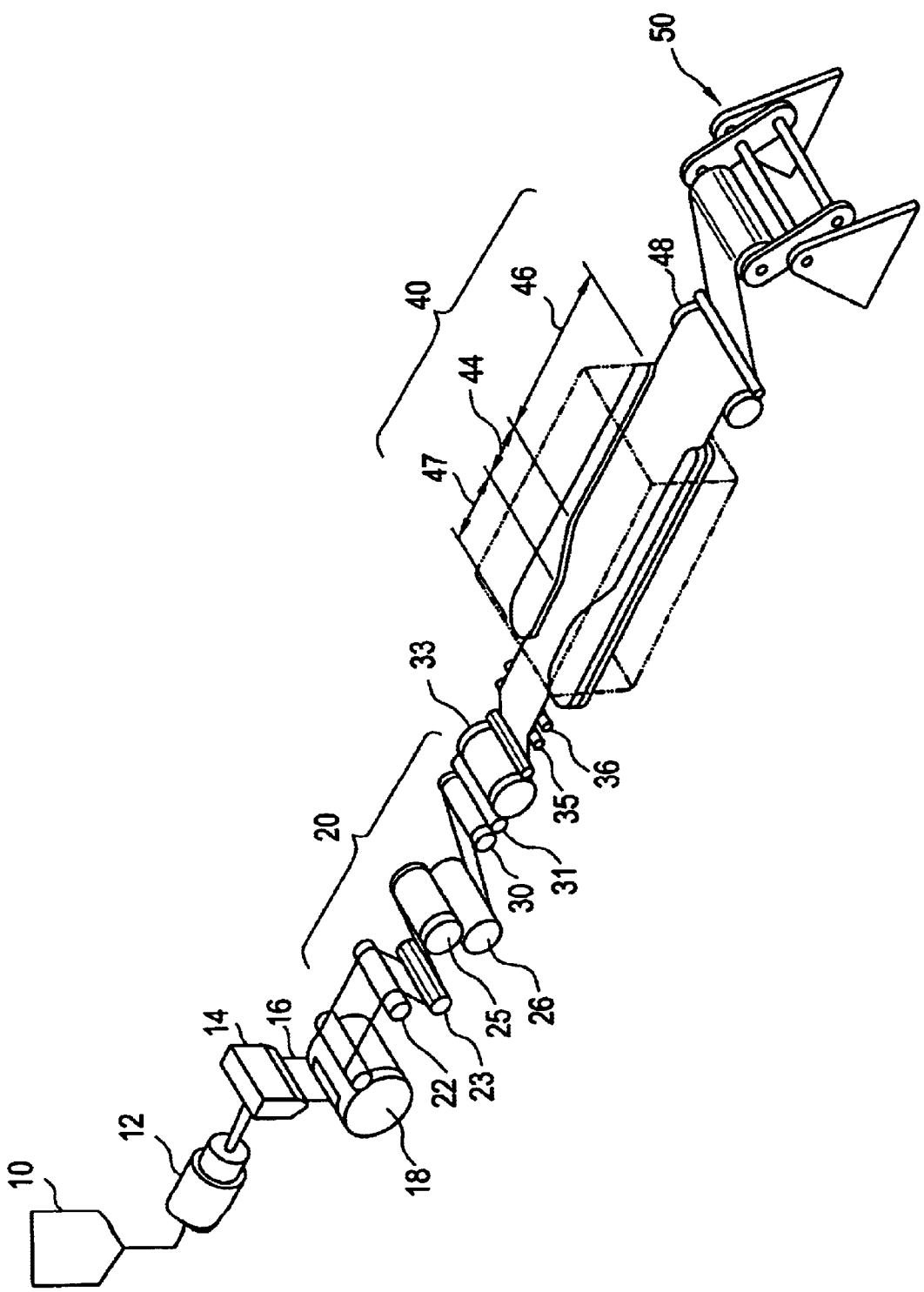
FIG. 1 is a schematic illustration in isometric view of a tenter frame system that may be employed in forming biaxially-oriented multilayer films in accordance with the present invention.

Heat-sealable multilayer polyolefin films, such as used in packaging of food items and the like, are generally formed by biaxial orientation procedures, and the invention will be described with respect to biaxially-oriented films. However, it is to be recognized that the invention will find application in other multilayer polyolefin films in which enhanced heat-seal and hot tack characteristics are desirable. Biaxially-oriented films can be characterized in terms of certain well-defined characteristics relating to their stereoregular structures and physical properties, including melt temperatures and shrinkage characteristics, as well as in relatively low coefficients of friction and relatively high tensile moduli and relatively low permeation rates to oxygen and water. Biaxially-oriented films of the type incorporating the present invention are formed with a heat-sealable surface layer incorporating a particular syndiotactic propylene polymer as described in greater detail below and by using any suitable oriented film production technique, such as the conventionally-used tenter frame process.

In general, such biaxially-oriented film production can be carried out by any suitable technique, such as disclosed in the aforementioned Canadian Patent Application No. 2,178, 104 to Peiffer et al. As described in the Peiffer et al application, the polymer or polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions. The machine direction orientation is accomplished through the use of two sequentially disposed rollers, the second or fast roller operating at a speed in relation to the slower roller corresponding to the desired orientation ratio. This may alternatively be accomplished through a series of rollers with increasing speeds, sometimes with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction is often followed by an annealing section. Subsequently, the film is then cooled and may be subjected to further treatment, such as corona treatment or flame treatment, as described, for example, in the aforementioned Canadian Patent Application No. 2,178,104 or in U.S. Pat. No. 4,029, 876 to Beatty, the entire disclosures of which are incorporated herein by reference. The film may also be metallicized as described in U.S. Pat. No. 4,692,380 to Reid, the entire disclosure of which is incorporated herein by reference. While corona and flame treatment typically occurs immediately following orientation and prior to the initial roll up, metallicizing is typically performed at a separate time and location.

Multilayer oriented films comprise a substrate layer, sometimes termed a "base layer" or "core layer," formed of a stereoregular propylene polymer, typically isotactic polypropylene homopolymer, chosen for good stiffness and other physical properties with one or more thinner surface layers used for heat-sealing as well as to provide other properties such as improved slip or barrier qualities, etc. Numerous methods exist for producing multilayer films including coextrusion, extrusion coating, extrusion laminating, or standard lamination techniques.

Heat-sealing can be accomplished by placing the heat-sealing surface layer in contact with a corresponding layer normally having the same or similar chemical make-up as the heat-sealing layer and using a combination of heat and pressure to create a seal bonding the two corresponding layers together. The heat-seal layer will be a surface layer in order to be able to contact and seal with another layer (or with a different section of itself). After sealing, it is possible that the sealed structure may constitute an internal layer in an even more complex multilayer film or composition of multilayer films.

The efficacy of a heat-seal layer can be characterized in terms of the heat-seal strength of the product, the seal initiation temperature (SIT) and the so-called "hot tack" characteristic, that is, the hot seal strength as measured shortly after formation of the laminated film layer. Typically, the hot seal strength will be measured at 250 milliseconds after formation of the surface layer substrate bond and at a following time interval of 500 milliseconds. The seal initiation temperature is the temperature at which the bonding of the surface layer to the corresponding layer begins to occur. Failure of a heat seal can occur through a number of mechanisms that can be characterized in terms of "peel," "web stretch," or "tear failure." Failure of a heat seal due to peel is characterized by a seal peeling apart at the interface. Failure due to web stretch occurs due to a differential strength between the web and the heat-seal. Failure because of tear involves a tearing of the web itself at the seal edge.

The heat-sealable surface layer is typically formed by coextrusion of the surface layer polymer with the substrate layer polymer. Co-extrusion can be carried out by simultaneously coinjecting the polymer of the heat-seal layer and the polymer of the substrate layer through a slotted die system to form a film formed of an outer layer of the heat-sealing polymer and substrate layer of the core polymer. Additional layers can also be coextruded, either as an additional heat-seal layer on the other surface of the substrate layer, or layers serving other finctions, such as barriers, anti-block layers, etc. Alternatively, a heat-seal layer can be extrusion coated later in the film making process. Also, other layers can be added to create a more complex film after or contemporaneous with the formation of the basic heat-seal layer to core layer relationship. The advantages of the present invention remain so long as the heat-seal layer is contiguous to and bonded with the substrate layer.

Turning now to FIG. 1, there is shown a schematic illustration of a suitable "Tenter Frame" orientation process that may be employed in producing biaxially-oriented polypropylene film in accordance with the present invention. More particularly and with reference to FIG. 1, a source of molten polymer is supplied from a hopper 10 to an extruder 12 and from there to a slot die 14 which produces a flat, relatively thick film 16 at its output. Film 16 is applied over a chill roller 18, and it is cooled to a suitable temperature within the range of about 30°–60° C. The film is drawn off the chill roller 18 to a stretching section 20 to which the machine direction orientation occurs by means of idler rollers 22 and 23 that lead to preheat rollers 25 and 26.

As the film is drawn off the chill roller 18 and passed over the idler rollers, it is cooled to a temperature of about 30°–60° C. In stretching the film in the machine direction, it is heated by preheat rollers 25 and 26 to an incremental temperature increase of about 60°–100° C. and then passed to the slow roller 30 of the longitudinal orienting mechanism. The slow roller may be operated at any suitable speed, usually about 20–40 feet per minute. The fast roller 31 is operated at a suitable speed, typically about 150 feet per minute, to provide a surface speed at the circumference of about 4–7 times that of the slow roller in order to orient the film in the machine direction. As the oriented film is withdrawn from the fast roller, it is passed over roller 33 at room temperature conditions. From here it is passed over tandem idler rollers 35 and 36 to a lateral stretching section 40 where the film is oriented by stretching in the transverse direction. The section 40 includes a preheat section 42 comprising a plurality of tandem heating rollers (not shown) where it is again reheated to a temperature within the range of 130°–180° C. From the preheat section 42 of the tenter frame, the film is passed to a stretching or draw section 44 where it is progressively stretched by means of tenter clips (not shown) which grasp the opposed sides of the film and progressively stretch it laterally until it reaches it maximum lateral dimension. Lateral stretching ratios are typically greater than machine direction stretch ratios and often may range from 5–12 times the original width. Lateral stretching ratios of 8–10 times are usually preferred. The concluding portion of the lateral stretching phase includes an annealing section 46, such as an oven housing, where the film is heated at a temperature within the range of 130°–170° C. for a suitable period of time, about 1–10 seconds. The annealing time helps control certain properties, and increased annealing can be used specifically to reduce shrinkage. The biaxially-oriented film is then withdrawn from the tenter frame and passed over a chill roller 48 where it is reduced to a temperature of less than about 50° C. and then applied to take-up spools on a take-up mechanism 50. From the foregoing description, it will be recognized that the initial orientation in the machine direction is carried out at a somewhat lower temperature than the orientation in the lateral dimension. For example, the film exiting the preheat rollers is stretched in the machine direction at a temperature of about 120° C. The film may be cooled to a temperature of about 50° C. and thereafter heated to a temperature of about 160° C. before it is subject to the progressive lateral dimension orientation in the tenter section.

From the foregoing description it will be recognized that biaxially-oriented film can have a number of properties to its advantage during and after the machine processing steps. A relatively low coefficient friction is desirable, both during the biaxially orientation procedure and in the end use applications of the ultimately-produced biaxially-oriented film. A relatively high stiffness, as indicated by the tensile modulus in both the machine direction and the transverse direction is usually advantageous. Relatively low permeabilities to gas and water are desirable in many applications. In addition, a high shrinkage factor of the processed film, while undesirable in some cases, can be advantageous in other applications, such as where the film is used in stretch wrapping of food products, electrical components, and the like.

Figure 2:
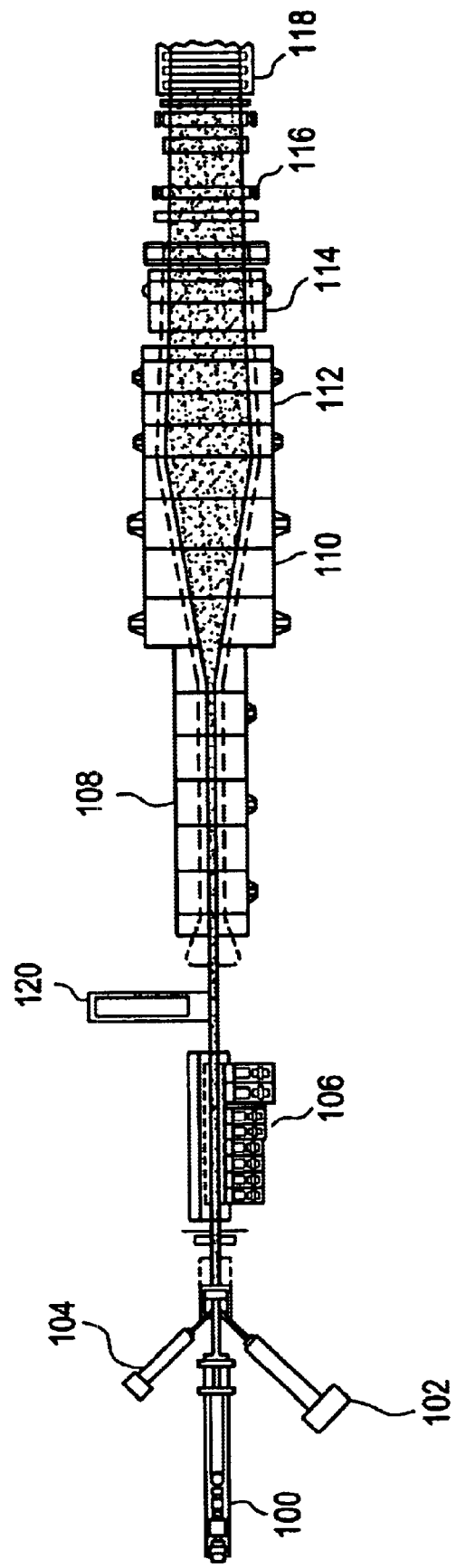
FIG. 2 is a schematic illustration of a tenter frame process incorporating systems for co-extrusion or extrusion coating of surface layers bonded to a substrate layer to produce multilayer films in accordance with the present invention.

FIG. 2 is a schematic diagram illustrating a tenter-frame process carried out with the co-extrusion of one or two surface layers with a substrate layer. The main extruder 100 is flanked by two supplemental extruders 102 and 104. Through the operation of one of the supplemental extruders 102 or 104, a separate polymer or polymer blend may be extruded to be in contact with the primary polymer or polymer blend forming the substrate supplied from the main extruder 100. If both supplemental extruders 102 and 104 are used, then a sandwich may be created with the primary polymer forming the core or substrate layer, and the polymers extruded by the supplemental extruders 102 and 104 forming surface layers. After extrusion and casting, the multilayer film continues through the machine direction orientation section 106, pre-heating section 108, transverse direction orientation section 110, annealing section 112, cooling section 114, corona treating section 116, and finally the take-up (or wind-up) section 118. In an alternative mode of operation, on one or more surface layers may be added in extrusion coating section 120, after machine direction orientation, but before transverse direction orientation. In extrusion coating section 120, additional material is extruded to coat either one or both surfaces of the mono-axially oriented film emerging from machine direction orientation section 106. The mono-axially oriented film supplied to be extrusion coated may be a mono-layer film generated by primary extruder 100, or may be a multilayer film created by co-extrusion by a combination of main extruder 100 and supplemental extruders 102 and/or 104.

The syndiotactic propylene polymer employed in forming the heal seal layer of the present invention can be characterized by a low seal initiation temperature (SIT) of less than 100° C. and effective seal strength characteristics at relatively low seal temperatures of about 110° C. or less. The seal initiation temperatures and the low temperature heat-seal strengths are substantially less than the corresponding values observed for isotactic polypropylene conventionally used in forming heat-seal layers. In fact, the SIT and heat-seal strength characteristics, together with the hot tack properties of the syndiotactic polypropylene, are generally better for the syndiotactic polypropylene film than for corresponding films produced with ethylene propylene copolymers.

The syndiotactic polypropylenes employed in the present invention are produced by the polymerization of propylene in the presence of a syndiospecific metallocene catalyst of the types disclosed in U.S. Pat. No. 4,892,851 to Ewen et al, U.S. Pat. No. 5,225,500 to Elder et al, and U.S. Pat. No. 5,243,002 to Razavi. The syndiospecific metallocenes may be employed as homogeneous catalyst systems, or they may be employed as supported catalyst systems as disclosed, for example, in U.S. Pat. No. 5,807,800 to Shamshoum et al. For a further description of suitable syndiospecific metallocene catalyst systems which can be employed in the polymerization of propylene to produce syndiotactic polypropylene, reference is made to the aforementioned patents to Ewen et al, Elder et al, Razavi, and Shamshoum et al, the entire disclosures of which are incorporated herein by reference.

As described in greater detail below, the syndiotactic polypropylene employed in forming the heat-seal layer of the present invention is characterized by a melt flow index which is less, usually substantially less, than the various other crystalline polymers or copolymers useful in forming heat seal layers. As a practical matter, the syndiotactic polypropylene is characterized by a melt flow index of less than 3 grams/10 minutes and preferably less than 2 grams/10 minutes. The melt flow index is characterized as the melt flow rate as determined in accordance with ASTM Standard D-1238 at 230° C. using 2.16 kilograms of force.

The heat-seal layer (or layers) and substrate layer are normally provided in configurations in which the surface layer has a thickness substantially less than the thickness of the substrate layer. For typical packaging applications, the substrate layer will exhibit an average thickness within the range of 5–150 microns. The heat-seal layer will have a thickness of no more than one-half the thickness of the substrate layer and usually less than ⅓ of the substrate layer. The surface layer typically will have a thickness within the range of 0.3–50 microns.

The substrate layer may be formed of various polymers or polymer blends as described previously. Isotactic polypropylene homopolymers or propylene/ethylene copolymers, typically containing no more than 10 wt .% ethylene, may be used to form the substrate layer. A preferred substrate layer incorporating polypropylene having a very high isotacticity is defined in terms of meso pentads and meso diads but also having irregularities in the polymer structure characterized in terms of 2,1 insertions as contrasted with the predominate 1,2 insertions characteristic of isotactic polypropylene. Thus the polymer chain of the isotactic polypropylene is characterized by intermittent head to head insertions to result in a polymer structure as exemplified below.

(5)

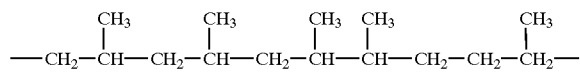

As shown by the polymer structure depicted by Formula (5), the occasional head-to-head insertion resulting from the use of the 2-alkyl substituted indenyl group results in adjacent pendant methyl groups separated by ethylene groups resulting in a polymer structure which behaves, somewhat in the fashion of a random ethylene propylene copolymer and results in a variable melting point. This results in a polymer which can be advantageously employed to produce a biaxially-oriented film having good characteristics in terms of strength in both the machine and transverse directions, low co-efficients for friction, and relatively low permeabilities to water and to oxygen. At the same time, the biaxially-oriented films thus produced have satisfactory haze properties, normally less than 1%, and good gloss characteristics, greater than 90%. This polymer can be prepared by the polymerization of propylene in the presence of a metallocene catalyst characterized by the formula

In Formula (6), R', R" are each independently a $C_1$–$C_4$ alkyl group or an phenyl group; Ind is an indenyl group substituted at the proximal position by the substituent $R_S$ and otherwise unsubstituted; Ri is an ethyl, methyl, isopropyl, or tertiary butyl group; Me is a transition metal selected from the group consisting of titanium, zirconium, hafnium, and vanadium; and each Q is independently a hydrocarbyl group or containing 1 to 4 carbon atoms or a halogen.

As indicated by Formula (6) above, the silyl bridge can be substituted with various substituents in which R' and R" are each independently a methyl group, an ethyl group, a propyl group (including an isopropyl group), and a butyl group (including a tertiary butyl or an isobutyl group). Alternatively, one or both of R', R" can take the place of a phenyl group. Suitable bridge structures are dimethylsilyl, diethylsilyl, and diphenylsilyl structures.

The Ri substituent at the 2 position (the proximal position with regard to the bridge head carbon atom) can be a methyl, ethyl, isopropyl, or tertiary butyl. Preferably, the substituent at the 2 position is a methyl group. As noted previously the indenyl group is otherwise unsubstituted except that it may be a hydrogenated indenyl group. Specifically, the indenyl ligand can take the form of a 2-methyl indenyl or a 2-methyl tetrahydroindenyl ligand. As will be recognized by those skilled in the art, the ligand structure should be a racemic structure in order to provide the desired enantiomorphic site control mechanism to produce the isotactic polymer configuration.

As described previously, the 2,1 insertions produce "mistakes" in the polymer structure which impart the desired non-uniform melting point characteristics of the present invention. The corresponding film is characterized in terms of low water and oxygen permeabilities and low coefficients of friction as described hereinafter. The "mistakes" due to the 2,1 insertions should not however be confused with mistakes resulting in racemic insertions as indicated, for example, by the following polymer structure:

(7)

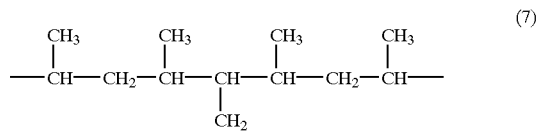

As will be recognized, the structure (7) can be indicated by the pentad mrrm. The "mistakes" corresponding to the head-to-head insertion mechanism involved in the present invention are not characterized by or are not necessarily characterized by racemic diads.

In experimental work carried out with respect to the present invention, the seal strength and hot tack characteristics of films formed of syndiotactic polypropylene were evaluated against films formed of isotactic propylene homopolymers and propylene/ethylene copolymers. The syndiotactic polypropylene was prepared by the polymerization of propylene in the presence of a syndiospecific bridged metallocene of the type disclosed in U.S. Pat. No. 4,892,851 to Ewen. Exemplary of such metallocene catalyst systems are metallocenes based upon cyclopentadienyl fluorenyl ligand structures such as isopropylidene (cyclopentadienyl fluorenyl) zirconium dichloride employed with a cocatalyst such as alumoxane. Such syndiotactic polypropylenes can also be prepared through the use of so-called "cationic" metallocenes that incorporate a stable non-coordinating anion and do not normally employ the present of an alumoxane. Syndiospecific cationic metallocenes are disclosed, for example, in the aforementioned U.S. Pat. No. 5,243,002. The syndiotactic polypropylene employed in the experimental work discussed below had a melt flow index of 1.5 g/10 min. and had a micro structure characterized by about 80% syndiotactic pentads (rrrr).

The isotactic polymers employed in the experimental work included both propylene homopolymers and propylene ethylene copolymers prepared by catalysis with isospecific metallocenes as disclosed in the aforementioned patents to Ewen and Ziegler-Natta catalysts as disclosed in the aforementioned patents to Mayr et al. The characteristics of the metallocene-based propylene homopolymers (identified herein as MP-1 through MP-4), the metallocene-based propylene ethylene copolymer (identified herein as MEP-5), the Ziegler-Natta homopolymer (identified herein as ZP-7), and the Ziegler-Natta propylene/ethylene copolymers (identified herein as ZEP-8 and ZEP-6) are set forth in Table I. In Table I the polymers are characterized in terms of melt flow index, MFI (the melt flow rate in grams/10 minutes), the ethylene content (EC) in wt. % where applicable, the xylene solubles content (XS) of the polymers, and, where available, the isotactic index I as indicated by the percent of meso pentads.

TABLE I

| Polymer | MFI | EC | I | XS |
|---------|-----|-----|------|------|
| MP1 | 5.5 | | 94.0 | .3 |
| MP2 | 13.7 | | 94.1 | .4 |
| MP3 | 9.4 | | 94.0 | .5 |
| MP4 | 3.3 | | 96.3 | .2 |
| MEP5 | 5.0 | 0.4 | 95.8 | .7 |
| ZEP6 | 4.9 | 6.8 | | 9.9 |
| ZP7 | 8.9 | | | 3.2 |
| ZEP8 | 5.0 | 6.1 | | 10.0 |

In the experimental work seal strength and hot tack characteristics of the syndiotactic polypropylene and in the above-identified polymers were evaluated on cast films of 50 microns. In carrying out the experimental work, the seal strengths were evaluated on films formed at temperatures starting below the seal initiation temperature to temperatures indicating a plateau in the seal strength characteristics.

Figure 3:
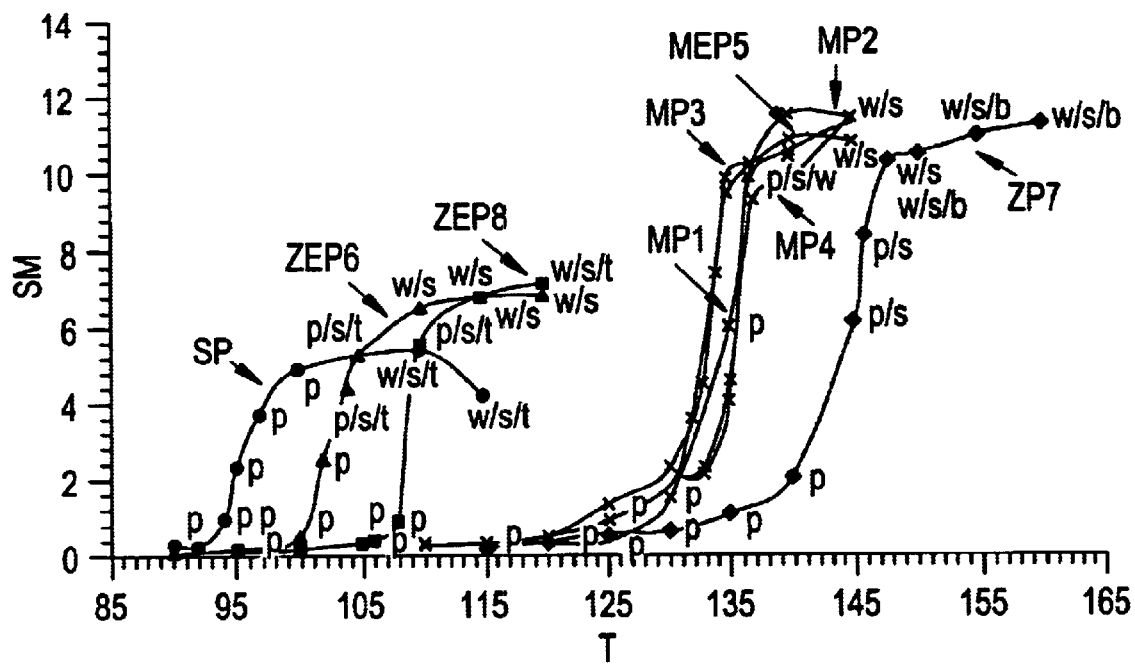
FIG. 3 is a graphical presentation of maximum seal strength versus seal temperature for heat-seal films formed of various polymers.

In FIG. 3, the maximum seal strength (SM) in newtons per centimeter is plotted on the ordinate versus the seal temperature T in degrees Centigrade on the abscissa for some of the above-described polymer systems. In FIG. 3, the curves are designated by the reference numerals SP for the syndiotactic polypropylene and by the designations shown in Table 1 for the several isotactic propylene homopolymers or copolymers.

Figure 4:
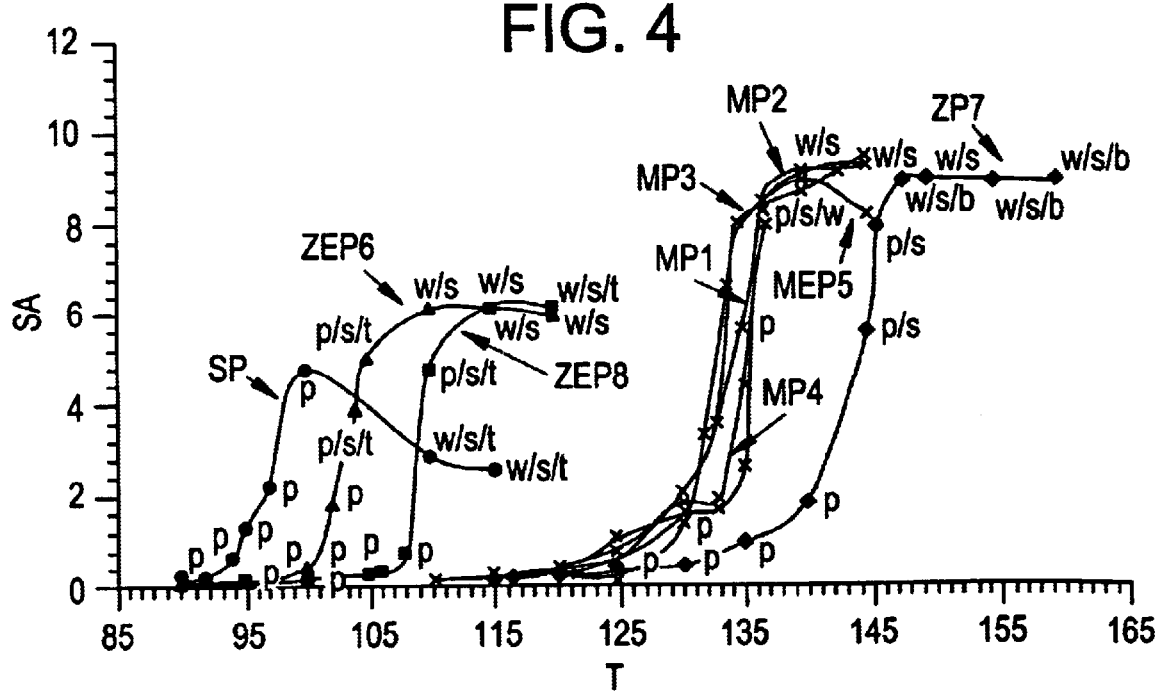
FIG. 4 is a graphical illustration of average seal strength versus seal temperature for the polymers illustrated in FIG. 3.

FIG. 4 shows graphs of average seal strength SA plotted on the ordinate versus the seal temperature in C° plotted on the abscissa. From an examination of FIGS. 3 and 4, it can be seen that the syndiotactic polypropylene film and the films formed with the Ziegler-Natta-based copolymers ZEP-6 and ZEP-8 exhibited much lower seal initiation temperatures (SIT) than the Ziegler-Natta homopolymers. Syndiotactic polypropylene exhibited a SIT of about 94° C., 6–7° below that of the copolymer ZEP-6, the highest ethylene content copolymer tested. The Ziegler-Natta copolymer had a somewhat higher seal initiation temperature of about 108° C., and as indicated, the seal temperatures of the remaining polymers were much higher, indicating SIT values of about 120–130° C. or even higher. As further indicated by the heal seal strength, the syndiotactic polypropylene develops maximum seal strength over a relatively broad plateau in the low temperature range. While temperatures within the range of 95–115° C. can be employed to achieve effective heal seals, maximum results are achieved within the range of 100–110° C.

Figure 5:
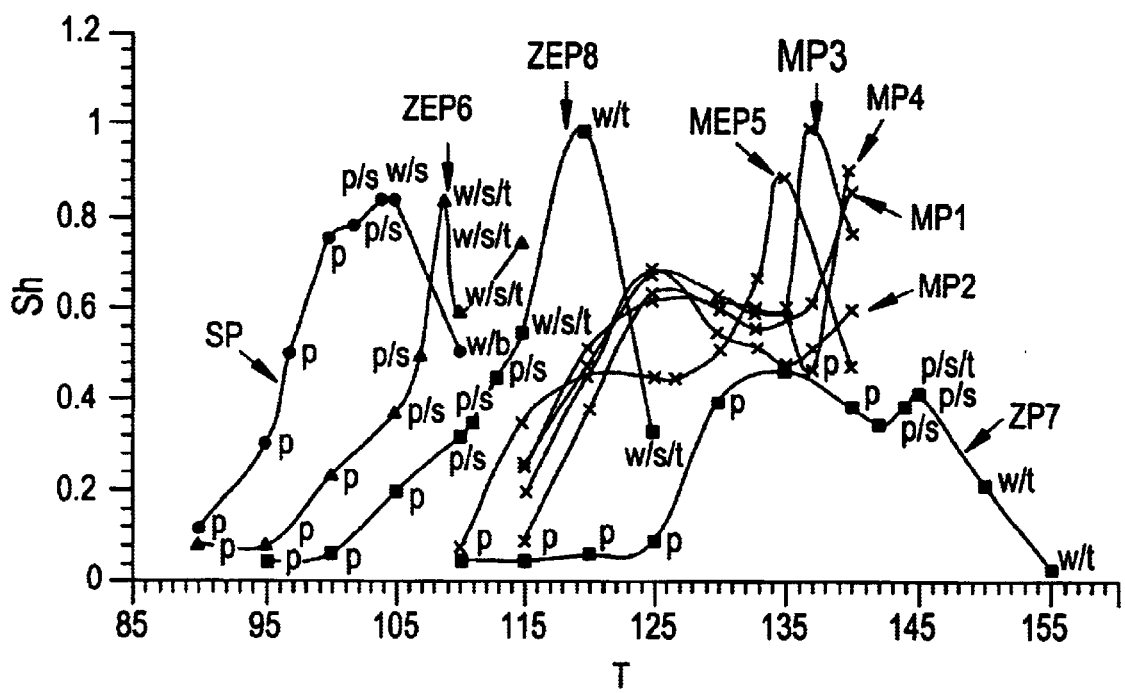
FIG. 5 is a graphical illustration of near term hot seal strength as a function of seal temperature for the various polymers depicted in FIG. 3.
Figure 6:
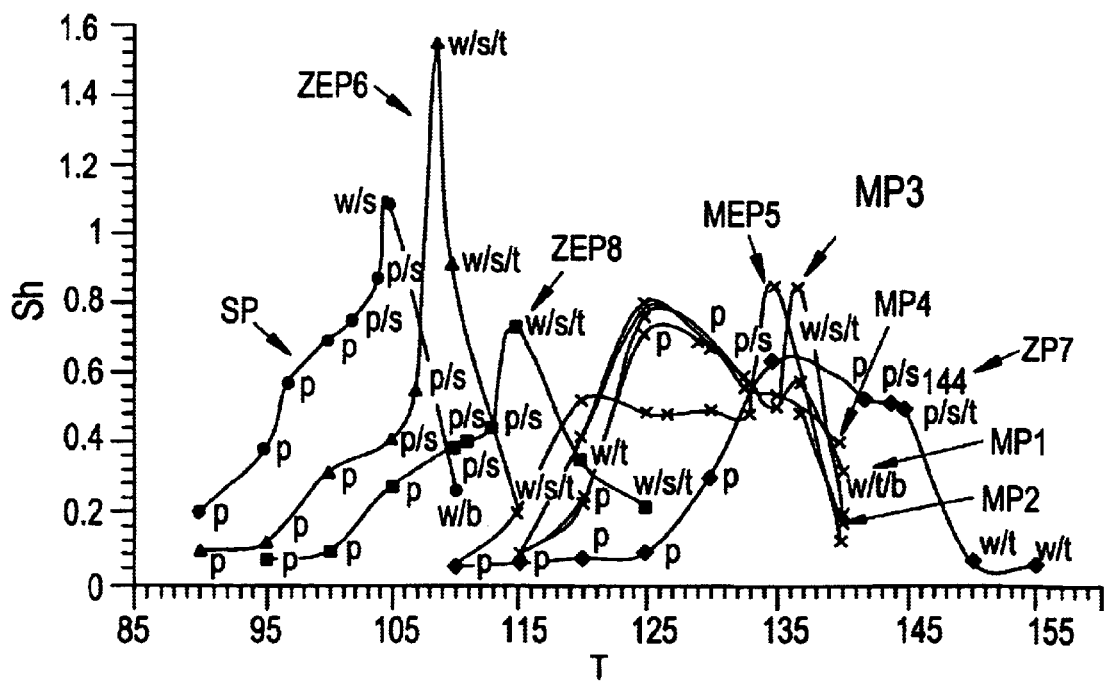
FIG. 6 is a graphical illustration of hot seal strength as a finction of seal temperature for the various polymers depicted in FIG. 3.

The hot tack performance of the syndiotactic polypropylene and the other polymers tested is shown in shown in FIGS. 5 and 6, which are graphs of the hot seal strength Sh in newtons per centimeter plotted on the ordinate versus the seal temperature T in ° C. plotted on the abscissa. In each of FIGS. 5 and 6, the curves showing the hot tack characteristics of the polymers are designated by the same reference characters as found in Table 1 and used in FIGS. 3 and 4. FIG. 5 indicates the hot seal strength, as measured at 250 milliseconds after bonding and FIG. 6, the hot seal strength at 500 milliseconds after bonding. As can be seen from an examination of FIGS. 5 and 6, the syndiotactic polypropylene film demonstrated hot tack performance which is substantially superior to the (metallocene-based and) Ziegler-Natta-based propylene/ethylene copolymers. In the hot tack performance of the remaining polymers, the MiPP homopolymers, as well as the Ziegler-Natta homopolymers, they are indicated substantially inferior in hot tack performance. In fact, at a seal temperature of 105° C., where the Ziegler-Natta-based propylene/ethylene copolymer begins to show a maximum seal strength greater than the syndiotactic propylene, the syndiotactic polypropylene film still shows far superior hot tack performance as measured in the near term and also the long term.

Having described specific embodiments of the present invention, it will be understood that modifications thereof may be suggested to those skilled in the art, and it is intended to cover all such modifications as fall within the scope of the appended claims.

What is claimed:

1. In a multilayer polyolefin film of a type suitable for packaging applications, the combination comprising:
   (a) a flexible substrate layer formed of a crystalline thermoplastic polymer having an interface surface; and
   (b) a heat sealable surface layer bonded to the interface surface of said substrate layer formed of a syndiotactic propylene polymer having a melt flow index of less than 2 grams/10 minutes produced by the polymerization of propylene in the presence of a syndiospecific metallocene catalyst and having a thickness which is less than the thickness of said substrate layer, said surface layer being effective to produce a heat seal with itself at a seal temperature less than 110° C.

2. The combination of claim 1 wherein said substrate layer is formed of a stereoregular propylene polymer.

3. The combination of claim 1 wherein said substrate layer has an average thickness within the range of 5–150 microns and said surface layer has a thickness which is no more than one-half the thickness of said substrate layer.

4. The combination of claim 1 wherein said substrate layer is formed of an isotactic propylene polymer.

5. The combination of claim 4 wherein said substrate layer is formed of an isotactic propylene polymer produced by the polymerization of propylene in the presence of an isospecific metallocene catalyst.

6. The combination of claim 1 wherein said substrate layer is formed of an ethylene propylene copolymer having an ethylene content of no more than 10 wt. %.

7. The combination of claim 1 wherein said multilayer film is oriented in at least one direction.

8. The combination of claim 1 wherein said multilayer film is biaxially oriented.

9. The combination of claim 1 wherein said multilayer film produces a maximum seal strength upon the heat sealing of said surface layer with itself at a temperature within the range of 95–110° C. of at least 4 newtons/centimeter.

10. The combination of claim 9 wherein said multilayer film produces a maximum seal strength of at least 4 newtons/centimeter throughout a predominant portion of the range of 100–110° C.

11. In a multilayer polyolefin film of a type suitable for packaging applications, the combination comprising:
   (a) a flexible substrate layer formed of a crystalline thermoplastic polymer having an interface surface provide by extruding said thermoplastic polymer to form said substrate layer; and
   (b) a heat-sealable surface layer formed by extruding a syndiotactic propylene polymer produced by the polymerization of propylene in the presence of a syndiospecific metallocene catalyst to form said surface layer and bonding said surface layer of said syndiotactic propylene polymer to the interface surface of said substrate layer at a temperature within the range of 150–260° C., said surface layer having a thickness which is less than the thickness of said substrate layer and being effective to produce a heat seal with itself at a seal temperature less than 110° C.

12. In a multilayer polyolefin film of a type suitable for packaging applications, the combination comprising:
   (a) a flexible substrate layer formed of a stereoregular propylene polymer having an interface surface; and
   (b) a heat sealable surface layer bonded to the interface surface of said substrate layer formed of a syndiotactic propylene polymer produced by the polymerization of propylene in the presence of a syndiospecific metallocene catalyst and characterized by a melt flow index of less than 2 grams/10 minutes, said surface layer having a thickness which is less than the thickness of said substrate layer and being effective to produce a heat seal with itself at a seal temperature of no more than 110° C.

13. The combination of claim 11 wherein said substrate layer is formed of an isotactic propylene polymer.

14. The combination of claim 12 wherein said substrate layer is formed of an ethylene/propylene copolymer having an ethylene content of no more than 10 wt. %.

15. In a multilayer polyolefin film of a type suitable for packaging applications, the combination comprising:
   (a) a flexible substrate layer formed of a crystalline thermoplastic polymer having an interface surface; and
   (b) a heat sealable surface layer bonded to the interface surface of said substrate layer formed of a syndiotactic propylene polymer produced by the polymerization of propylene in the presence of a syndiospecific metallocene catalyst and having a thickness which is less than the thickness of said substrate layer, said surface layer being effective to produce a heat seal with itself at a seal temperature less than 110° C. and having a maximum seal strength of at least 4 Newtons/centimeters throughout a predominant portion of the range of 100–110° C.

16. The combination of claim 15 wherein said syndiotactic polypropylene is characterized by a melt flow index of less than 3 grams/10 minutes.

17. The combination of claim 16 wherein said syndiotactic polypropylene is characterized by a melt flow index of less than 2 grams/10 minutes.

18. The combination of claim 16 wherein said substrate layer is formed of an isotactic propylene polymer.

19. The combination of claim 17 wherein said substrate layer is formed of an isotactic propylene polymer produced by the polymerization of propylene in the presence of an isospecific metallocene catalyst.

* * * * *